United States Patent [19]

Orth et al.

[11] Patent Number: 4,955,543
[45] Date of Patent: Sep. 11, 1990

[54] VEHICLE PANE WASHING APPARATUS, PARTICULARLY FOR HEADLIGHT DIFFUSING LENSES

[75] Inventors: Peter Orth; Ulrich Witt, both of Lippstadt, Fed. Rep. of Germany

[73] Assignee: Hella KG Hueck & Co., Lippstadt, Fed. Rep. of Germany

[21] Appl. No.: 394,063

[22] Filed: Aug. 14, 1989

[30] Foreign Application Priority Data

Aug. 26, 1988 [DE] Fed. Rep. of Germany ....... 3828999

[51] Int. Cl.$^5$ ............................ B60S 1/48; B60S 1/56
[52] U.S. Cl. .................................. 239/284.2; 239/205; 239/533.15
[58] Field of Search .............................. 239/203–205, 239/284.1, 284.2, 533.15, 583

[56] References Cited

U.S. PATENT DOCUMENTS

| 3,059,857 | 10/1962 | Friant et al. | 239/284.1 X |
| 3,297,260 | 1/1967 | Barlow | 239/533.15 |
| 3,393,873 | 7/1968 | Larson | 239/533.15 |

FOREIGN PATENT DOCUMENTS

| 2418140 | 10/1975 | Fed. Rep. of Germany. |
| 3518685 | 6/1986 | Fed. Rep. of Germany. |
| 2523909 | 9/1983 | France. |
| 1375745 | 11/1974 | United Kingdom | 239/284.2 |

Primary Examiner—Andres Kashnikow
Assistant Examiner—William Grant
Attorney, Agent, or Firm—Griffin, Branigan & Butler

[57] ABSTRACT

A pane washing apparatus for a motor vehicle comprises a pressure source to drive a cleaning fluid which in turn activates a valve and a jet nozzle associated with a jet-nozzle carrier which is movable from a pulled-back rest position to an operational, deployed position. The valve is first opened once the jet-nozzle carrier has moved the jet nozzle to the deployed position. The valve includes a cap which loosely covers a passage opening in the jet-nozzle carrier leading to the jet nozzle but which follows movement of the jet-nozzle carrier until its peripheral area contacts a fixed stop thereby uncovering the passage opening immediately before the jet nozzle reaches its deployed position. The cap is pressed against the jet-nozzle carrier by cleaning fluid pressure, a spring or a permanent magnet.

10 Claims, 1 Drawing Sheet

VEHICLE PANE WASHING APPARATUS, PARTICULARLY FOR HEADLIGHT DIFFUSING LENSES

This invention relates generally to the art of pane washing apparatus for motor vehicles and particularly to devices for washing headlight diffusers with a pressure source for pressurizing cleaning fluid to drive a jet nozzle from a pulled-back rest position to a deployed position and then to spray the diffuser. Even more particularly, this invention concerns such a pane washing apparatus which includes a jet-nozzle carrier to which the cleaning fluid pressure is applied to overcome the force of a spring and which is associated with a valve which is opened when a jet nozzle on the jet-nozzle carrier is almost in its fully deployed position.

Such a pane washing apparatus is described in German Patent document DE-PS No. 24 18 140. In the pane washing apparatus of this publication a pressure relief valve is combined with a jet nozzle in a housing. For this reason, such a jet nozzle body, which is usually supported on a vehicle bumper below a headlight, is quite large. Such a device is most beneficially used when a distance traveled by the jet nozzle from a rest position to a deployed position is quite large because, in such an embodiment, a space occupied by a water column between the valve and the jet nozzle is not dependent on the distance the jet nozzle travels and can be maintained quite small. This is important because after each spray activation water in the column between the valve and the jet nozzle is forced out of the jet nozzle by centrifugal force when a vehicle travels about a curve so that for a next spray activation the space of this column must again be filled. However, a disadvantage that arises from use of a pressure relief valve in such a pane washing apparatus is that a jet-nozzle carrier thereof must be deployed before a pressure source can employ its optimal spray pressure. In order to achieve a proper spray pattern, the optimal pressure for a particular jet nozzle opening has both high and low thresholds. With regard to the lower threshold, the pressure relief valve must accurately open at a pressure above a pressure for realibly driving the jet-nozzle carrier to the deployed position. For this reason, working pressure surfaces of the jet-nozzle carrier and an operation member of the relief valve must have a particular relationship one to the other.

In German Patent Publication DE-PS No. 35 18 685, a headlight washing system is disclosed in which a relief valve is not on the head of a jet nozzle driven outwardly to a deployed position, but rather is on a lower end of a jet-nozzle carrier. When built in this manner, a jet-nozzle carrier is substantially flatter, however, the pressure/force relationship between the jet-nozzle carrier and the closing part of the relief valve must be such that a jet nozzle reaches its fully deployed position before the valve is opened.

In a prior art arrangement disclosed in French Patent document FR-OS No. 2 523 909 a jet-nozzle carrier is in the form of a piston which is driven by a pressure source against the force of a spring. The piston has a ring-formed, surrounding, groove at its middle area which is in communication with a central bore of the piston leading to a jet nozzle. A cylinder in which the piston is positioned has a bypass line which brings the contents of the cylinder in front of the piston at a particular position of the piston in communication with the ring groove of the piston. Such an apparatus is difficult to construct since the cylinder, the by-pass line, and the piston must have double surrounding seals.

It is an object of this invention to provide a pane washing apparatus in which a valve is arranged upstream of a jet-nozzle carrier in such a manner that a housing for a jet nozzle can be extremely small and in which a valve can be used which reliably opens when the jet nozzle reaches its outwardly driven deployed position.

It is a further object of this invention to provide such a pane washing apparatus in which a valve arrangement does not require an additional passage or lead, outside of the jet nozzle valve carrier housing.

SUMMARY OF THE INVENTION

According to principles of this invention, a passage opening in a jet-nozzle carrier leading to a jet nozzle is covered by a loose cap which follows outward movement of the jet-nozzle carrier, toward a deployed position, but whose peripheral area contacts a fixed stop shortly before the jet nozzle reaches its deployed position to uncover the passage opening.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
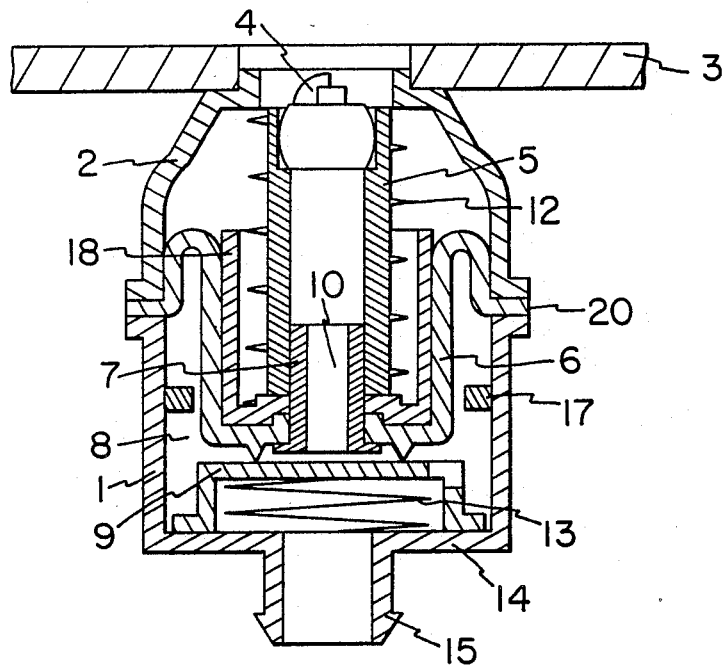
FIG. 1 is a cross-sectional view of a jet nozzle and valve assembly in a housing mounted on a vehicle chassis wall with the jet nozzle thereof being in a rest position.
Figure 2:
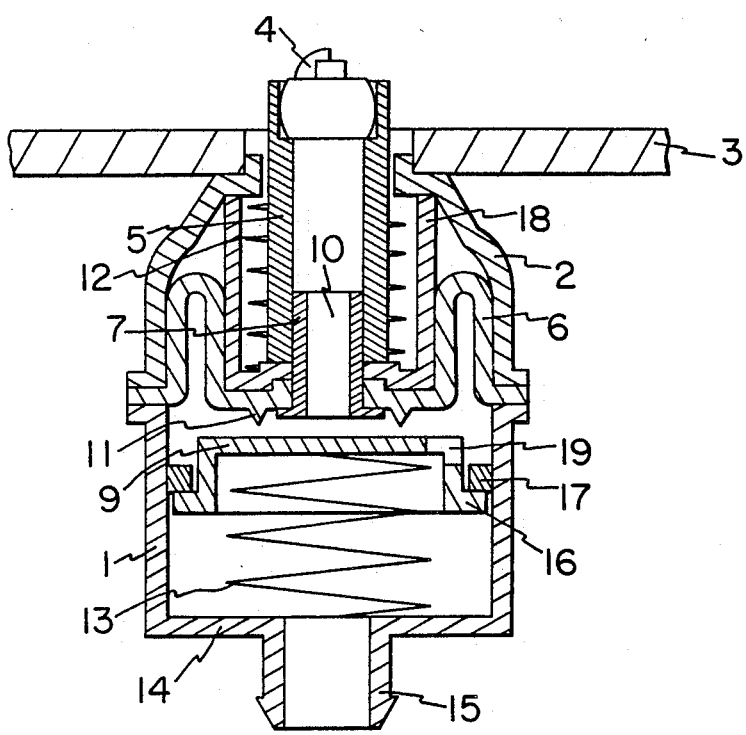
FIG. 2 is a view similar to the view of FIG. 1, but with the jet nozzle being in a deployed position.

A housing comprised of a lower housing part 1 and an upper housing part 2 containing a jet nozzle 4 and valve apparatus is positioned below a vehicle chassis wall 3. In a rest position, the jet nozzle 4 is inside the housing. In a deployed, operational, or working, position, the jet nozzle 4 is raised out of its pulled back, rest position to be above the chassis wall 3. The jet nozzle 4 is arranged on a jet-nozzle carrier comprised of a tubularly-shaped, rigid, inner shell 5 and a resilient, impervious, roll membrane 6 which are coupled together by a joining piece 7. A peripheral portion 20 of the roll membrane 6 is clamped between the lower and upper parts 1 and 2 of the housing. A lower space 8 defined by the lower housing part 1 and the roll membrane 6 is a pressure space which is sealed by means of a valve positioned opposite the jet nozzle 4. The valve comprises a loose cap 9 which lies against the membrane 6 when the valve is in a closed state so as to cover and seal a passage opening 10 in the jet-nozzle carrier to the jet nozzle 4. In this regard, the roll membrane has a ring formed, protruding, sealing lip 11 on its surface facing the cap 9 which provides a reliable sealing between the roll membrane 6 and the cap 9 even when they are pressed together by small amounts of pressure.

When pressure from a pressure source is reduced in the interior space 8 the roll membrane 6 is urged toward the inner shell by means of an expanding spring 12 positioned between the cap 9 and the upper housing part 2 and this spring force is countered by force of an expanding spring 13 which extends between a floor 14 of the lower housing part 1 and the cap 9. In this position, the passage opening 10 to the jet nozzle 4 is hermetically sealed to prevent flow between the upper and lower housing parts 1 and 2.

If the pressure source is activated, a cleaning fluid flows through an input passageway 15 and an opening 19 in the cap 9 into the interior space 8 and develops therein a pressure that lifts the roll membrane 6 in the direction of the jet nozzle 4. It follows that the jet-nozzle carrier comprising the inner shell 5, the roll membrane 6, and the joining piece 7, is driven out of its rest position so that the jet nozzle 4 rises above the chassis wall 3. During the rising of the jet-nozzle carrier and jet nozzle 4, the cap 9 remains engaged with the sealing lip 11 until its peripheral area 16 contacts a fixed stop 17 on the lower housing part 1. The cap 9 then remains in this position, however, the jet-nozzle carrier, comprising the inner shell 5, the roll membrane 6 and the joining piece 7, continues its upward movement yet a small distance. Because of this continued movement for a small distance, the passage opening 10 which leads to the jet nozzle 4 is opened so that the pressurized cleaning fluid from the interior space 8 flows to the jet nozzle 4.

If the pressure source is then deactivated, or turned off, the roll membrane 6 will be pressed downwardly by the expanding spring 12 against the cap 9. The cap 9 will, in turn, against the force of the spring 13, again be pressed to the floor 14 of the lower housing part 1 and the valve will again be closed.

To prevent the roll membrane 6 from bulging out or in from cleaning fluid pressure, it is placed between the upper housing part 2 and an auxiliary inner shell 18, which is affixed to the inner shell 5, so that it is held against, or comes in contact with, the upper housing part 2 and the auxiliary inner shell 18 when it is moving the jet nozzle 4. The auxiliary inner shell 18, at the same time, also serves as a spacer between the roll membrane 6 and the upper housing part 2.

It is particularly beneficial according to the invention that the cap is pressed against the jet-nozzle carrier by a spring. In this manner, it is possible to provide the cap with a large number of large openings so that the cap presents very little flow resistance. A similar solution can also be reached if the jet-nozzle carrier, or the cap, is provided with a permanent magnet while the opposite part is completely, or partially, constructed of a magnetic material.

In another embodiment, not illustrated herein, the cap is held against the jet-nozzle carrier only by fluid flow of the cleaning fluid which is directed against the cap.

Also, it is useful to form the cap so as to have an outside diameter large enough to guide the cap with the wall of a housing for the jet-nozzle carrier. In this regard, the cap has an eccentrically positioned opening, positioned away from the passage opening to the jet nozzle through the jet-nozzle carrier.

In the beneficial embodiment of the invention, the jet-nozzle carrier is constructed from a roll membrane which is mounted between housing parts, which has a sealing lip directed toward the cap, and which, in its central area, supports a tubular inner shell for forming a portion of the jet nozzle. This is a particularly uncomplicated, however reliable, construction.

To ensure that the roll membrane reliably rolls without producing sideward bulges a portion of the jet nozzle supporting inner shell and the housing serve as surfaces on which the roll membrane rolls.

The embodiments of the invention in which an exclusive property or privilege are claimed are defined as follows:

1. In a pane washing apparatus for vehicles including in particular a spraying type apparatus of the type comprising a jet nozzle which is driven against spring force from a pulled-back rest position to a deployed position by means of a jet-nozzle carrier which is acted upon by pressurized cleaning fluid, said spraying type apparatus further comprising a valve that is only opened once the jet-nozzle carrier is in the deployed position;
   the improvement wherein:
   the jet-nozzle carrier defines therein a passage opening leading to the jet nozzle;
   the said valve includes a cap for being pressed against the jet nozzle carrier to close said passage opening, said cap following the movement of the jet-nozzle carrier toward a deployed position; and
   a stop means for contacting said cap shortly before said jet nozzle reaches said deployed position to open said passage opening and thereby allow flow of pressurized cleaning fluid to said jet nozzle.

2. In a pane washing apparatus as in claim 1 further including a spring for urging the cap against the jet-nozzle carrier for thereby closing the passage opening.

3. In a pane washing apparatus as in claim 1 wherein the cap is urged against the jet-nozzle carrier by flow of the cleaning fluid.

4. In a pane washing apparatus as in claim 1 wherein the washing apparatus comprises a lower housing part which engages a peripheral area of the cap to thereby guide the cap in its movement.

5. In a pane washing apparatus as in claim 4 wherein the cap defines an eccentrically located opening therethrough away from that portion of the cap covering the passage opening in the jet-nozzle carrier.

6. In a pane washing apparatus as in claim 1 wherein the jet-nozzle carrier comprises a roll membrane and a tubularly shaped inner shell.

7. In a pane washing apparatus as in claim 6 wherein said spaying type apparatus is enclosed in a housing comprising an upper housing part and a lower housing part and wherein the roll membrane is clamped between the upper and lower housing parts.

8. In a pane washing apparatus as in claim 6 wherein the roll membrane includes a ring-shaped sealing lip protruding toward the cap.

9. In a pane washing apparatus as in claim 7 wherein the roll membrane rolls against the upper housing part and an interior shell of the nozzle carrier during its movement.

10. In a pane washing apparatus as in claim 9 further including an expanding spring between the upper housing part and the inner shell to drive the jet nozzle toward a rest position.

* * * * *